US006332486B1

(12) United States Patent
Ahn et al.

(10) Patent No.: US 6,332,486 B1
(45) Date of Patent: Dec. 25, 2001

(54) RADIAL TIRE WITH SPECIFIED OUTSIDE PROFILE, CARCASS PROFILE AND BEAD FILLER PROFILE

(75) Inventors: Myeong Hun Ahn; Keun Woo Kim; Kyun Ok Kim; Yong Hee Kim; Hwi Joong Kim, all of Taejon (KR)

(73) Assignee: Hankook Tire Manufacturing CO LTD, Seoul (KR)

( * ) Notice: Subject to any disclaimer, the term of this patent is extended or adjusted under 35 U.S.C. 154(b) by 0 days.

(21) Appl. No.: 09/110,269

(22) Filed: Jul. 6, 1998

(30) Foreign Application Priority Data

| Jul. 5, 1997 | (KR) | 97-31200 |
| Jul. 5, 1997 | (KR) | 97-31201 |
| May 23, 1998 | (KR) | 98-18673 |

(51) Int. Cl.⁷ .............. B60C 3/00; B60C 3/04; B60C 9/02; B60C 15/00; B60C 15/06
(52) U.S. Cl. .............. 152/454; 152/539; 152/546; 152/548
(58) Field of Search .............. 152/454, 546, 152/539, 548

(56) References Cited

U.S. PATENT DOCUMENTS

| 4,513,802 | 4/1985 | Togashi et al. . |
| 4,867,218 | 9/1989 | Asano et al. . |
| 5,178,716 | 1/1993 | Hanada et al. . |

FOREIGN PATENT DOCUMENTS

| 55110604 | 8/1980 | (JP) . |
| 58161616 | 9/1983 | (JP) . |
| 5948204 | 3/1984 | (JP) . |
| 6060003 | 4/1985 | (JP) . |
| 6060004 | 4/1985 | (JP) . |
| 6060005 | 4/1985 | (JP) . |
| 61222801 | 10/1986 | (JP) . |
| 08142601 | 6/1996 | (JP) . |
| 08142602 | 6/1996 | (JP) . |

*Primary Examiner*—Adrienne C. Johnstone

(57) ABSTRACT

A radial tire when mounted on a rim and filled to normal inner pressure has a ratio of the upper cross-sectional height USH to the cross-sectional height SH between 0.50 and 0.59, a ratio of the lower cross-sectional height LSH to SH between 0.40 and 0.50, a rim width of more than 1.40 times the measuring rim width MRW but less than 1.45 MRW, an aspect ratio of less than 0.65, a beadfiller height of greater than 0.224 SH, and an angle between the tangent to the carcass line at a bead upper point B and a line extending in parallel with the rotation axis of the tire is less than 45°.

5 Claims, 8 Drawing Sheets

RADIAL TIRE WITH SPECIFIED OUTSIDE PROFILE, CARCASS PROFILE AND BEAD FILLER PROFILE

BACKGROUND OF THE INVENTION

1. Field of the Invention

The present invention relates to a radial tire, more particularly to a radial tire with improved riding comfort and driving stability.

2. Description of the Prior Art

In general, the performance of a radial tire may be improved if the tread of the tire is very stiff. However, this reduces driving stability because the radial carcass cords of a tire tend to weaken the lateral stiffness of the sidewall of the tire. In such cases, the driving stability may be improved in a number of ways, for example, by changing the material and the number of the carcass cords, by changing the rubber material of the sidewall, by supplementing cord layers to strengthen the bead or by redesigning the mold profile of the tire. The driving stability may be improved by modifying the beadfiller profile.

More recently, driving stability has been improved by raising the height of the beadfiller or lowering the cross-sectional height of the beadfiller by using a light beadfiller. However, this may cause the lateral stiffness and the vertical stiffness of the tire to increase thereby adversely affecting riding comfort.

Japanese Patent Laid-Open No. 55-110604 published in 1980 and Japanese Patent Laid-Open No. 61-303392 published in 1986 seek to address these problems. Therein, the ratio of USH to SH (the ratio of upper cross-sectional height to cross-sectional height upon mounting the radial tire on the rim and filling to normal internal pressure) of the carcass profile was increased to enhance both riding comfort and steering stability.

Whilst prior art techniques may, in general, be able to improve certain characteristics of a radial tire, they may at the same time adversely affect other important features such as driving stability and cornering forces or steering stability. A further drawback is that in order to improve the specific performance level of a tire, a tire designer has to design a modified carcass form appropriate for this specific performance, and also consider both the form and hardness of the beadfiller to keep the desired shape of the carcass.

BRIEF SUMMARY OF THE INVENTION

The present invention seeks to provide a radial tire having an overall improved performance over prior art radial tires. Thus, the carcass profile and beadfiller profile may be manipulated together with the cross-sectional width of the tire to enhance the performance of existing prior art radial tires. Properties such as driving stability and riding comfort are therefore enhanced but not at the expense of other properties.

Thus viewed from one aspect, the present invention provides a radial tire capable of being mounted on a rim and filled to normal internal pressure such that the ratio of upper cross-sectional height (USH) to cross-sectional height(SH)is within the range 0.5 to 0.59; the ratio of lower cross-sectional height (LSH) to cross-sectional height (SH) is in the range of 0.40 to 0.50; the rim width is more than 1.40×measuring rim width and less than 1.45×measuring rim width; the aspect ratio is less than 0.65; the beadfiller height (BH) is more than 0.224×SH; the angle between the tangent to the carcass line at a bead upper point (B) and the line extending in parallel with the rotational axis of the tire is less than 45°.

The term "measuring rim width(MRW)" used herein means the rim of the optimum condition being specified according to a tire size, which can be achieved when the tire is mounted on the rim, and which is shown in YEAR BOOK of TRA(Tire Rim Association). That is, when designing a tire, rim width and measuring rim width may be different.

The radial tire according to the present invention has many advantages over that of the prior art. Some of these are discussed by way of example hereinafter. It is able to simultaneously enhance stiffness, riding comfort and driving stability without adversely affecting other aspects of the tire performance. This is achieved by modifying the radial carcass ply and outside form, reducing the cross-sectional center of the tire, making the cross-sectional width of the tire as wide as possible, using a light beadfiller, and sloping the beadfiller more than in the prior art.

To achieve these advantages, the profile of the radial tire is manipulated under conditions in which the radial tire is mounted and filled with normal inner pressure. The ratio of USH to SH and that of LSH to SH is within the range 0.50 to 0.59 and 0.40 to 0.50 respectively. The rim width is more than 1.40×MRW and less than 1.45×MRW. The aspect ratio is less than 0.65, the angle between the tangent to the carcass line at a bead upper point (B) and the line extending in parallel with the rotation axis of the tire is less than 45°. The beadfiller height (BH) is greater than 0.224×SH.

Preferably, the Shore A hardness of the beadfiller is greater than 85°.

Preferably, xb (the component of the x axis of the bead upper point B) is greater than the measuring rim width×0.5 and particularly preferably is within the range measuring rim width +5–10 mm.

BRIEF DESCRIPTION OF THE INVENTION

The invention will now be described, but not limited, with reference to the accompanying drawings in which.

DETAILED DESCRIPTION OF THE INVENTION

Herein the following terms are used:

| | |
|---|---|
| Kv | vertical stiffness of tire |
| Kd | torsion stiffness of tire |
| Kl | lateral stiffness of tire |
| α | belt edge point angle |
| B | bead upper point |
| D | belt edge point |
| RW | measuring rim width |
| BH | beadfiller height |
| SW | cross-sectional width |
| SH | cross-sectional height |
| LSH | lower cross-sectional height |
| USH | upper cross-sectional height |
| Sr | vertical stiffness of sidewall |
| Sl | lateral stiffness of sidewall |

Figure 1:
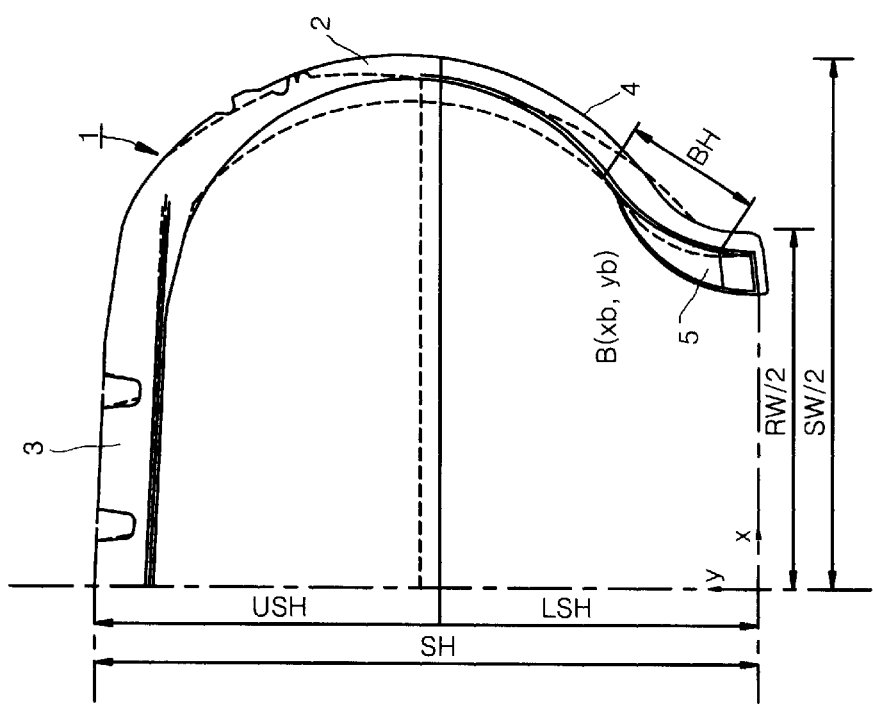
FIG. 1 is a cross-sectional view of a radial tire according to the present invention compared to that of a conventional radial tire.

As illustrated in FIG. 1, the bead upper point (B(xb,yb)) in the radial tire(1) is defined as follows: When the x and y axis are optionally set on the surface including a carcass line, each 1 mm co-ordinate of the carcass line for the section where the carcass inwardly wraps the beadfiller(5) is measured. Providing that the curvature radius is calculated from those co-ordinates, the co-ordinate where the sign of the curvature radius change is defined as a bead upper point(B: carcass curve point). In the case of a limitless curvature radius, the co-ordinate in the middle of the section is the bead upper point(B).

Figure 2:
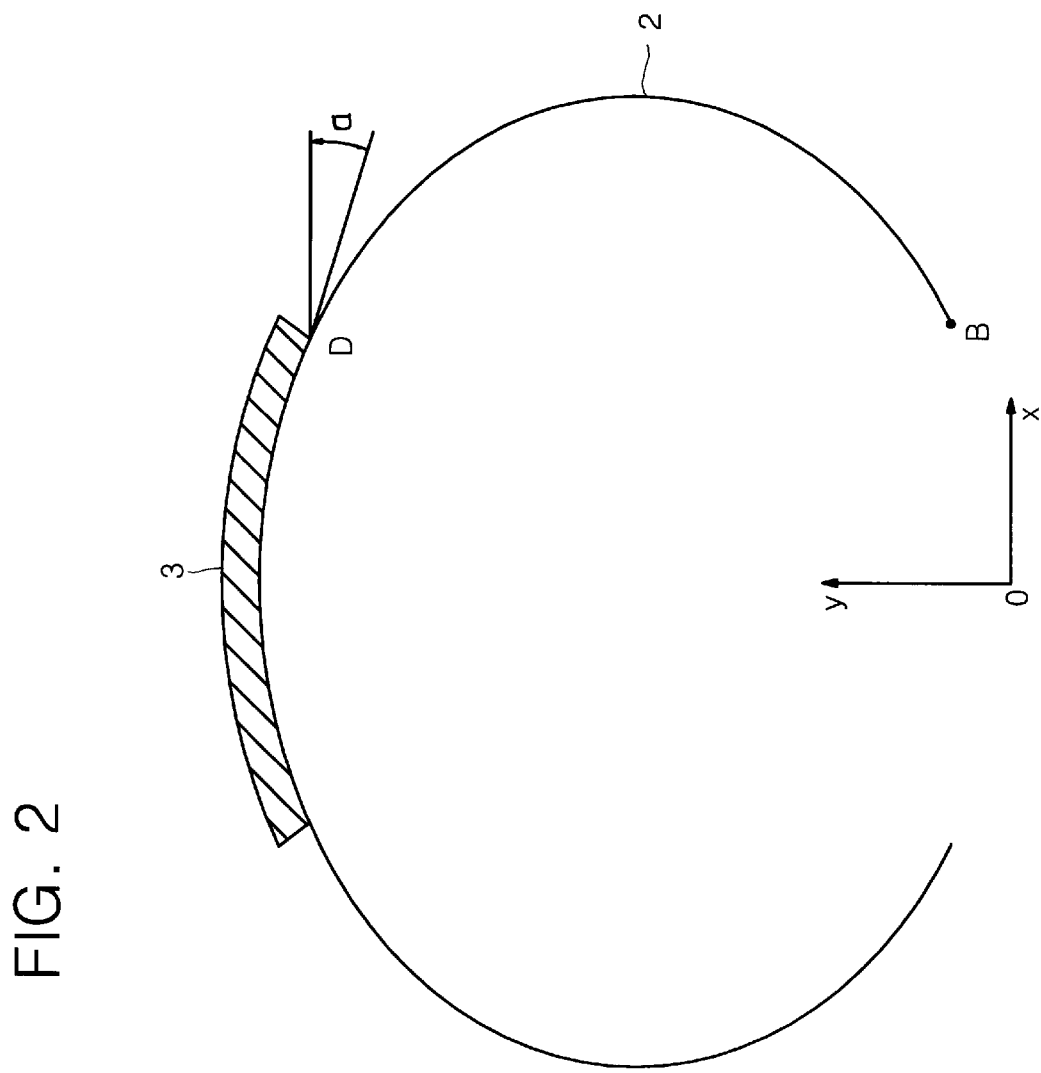
FIG. 2 is a simplified cross-sectional view of the sidewall of the radial tire as a membrane model.

As shown in FIG. 2, the tire is illustrated as a membrane model which contains the sidewall(2) between the bead upper point ((B) corresponding to the carcass curve point in an actual tire as seen in FIG. 1) and the belt edge point(D). In determining the stiffness of the sidewall(2) upon changing the profile, the location of B and the belt edge point angle(α—the angle between the tangent to the belt edge point of the carcass line and the line parallel to rotational axis of the tire which passes through the belt edge(D) have been recognized as key components.

Figure 3:
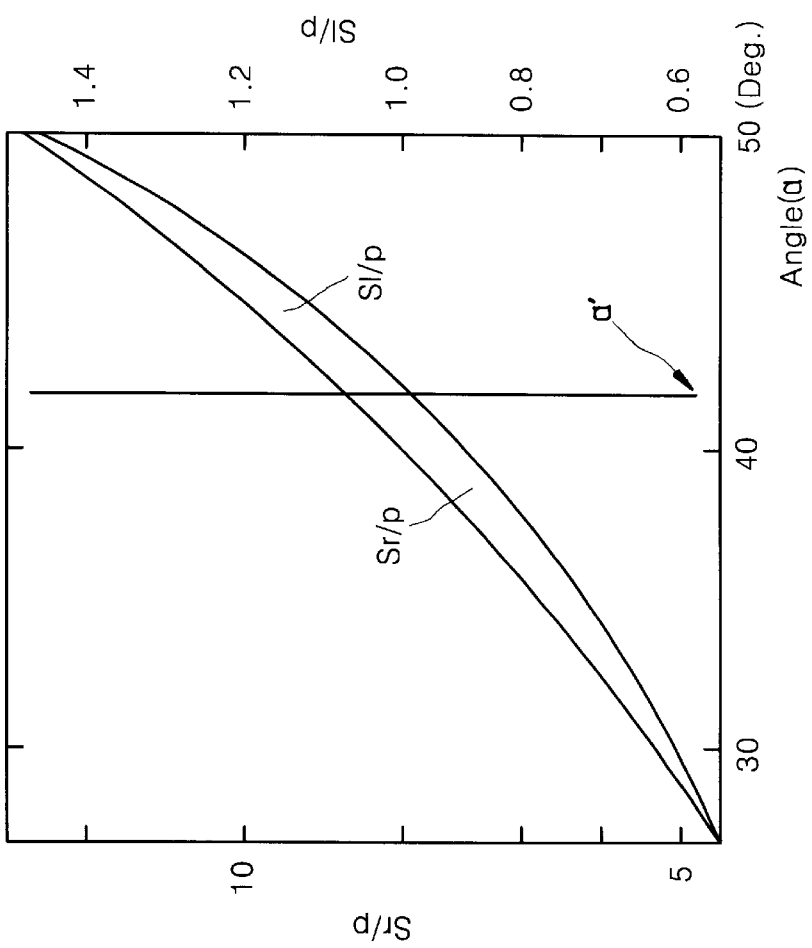
FIG. 3 is a diagram comparing the angle-dependent change of the vertical stiffness and the lateral stiffness of the sidewall of the tire.

As illustrated in FIG. 3, the stiffness of the sidewall increases in proportion to a at the belt edge point (D). However, since the increasing rate of slope of the vertical stiffness of the sidewall is different from that of the lateral stiffness of the sidewall, the latter is higher than the former when the belt edge point angle α is smaller than α' and the former is higher than the latter when the belt edge point angle α is larger than α'.

Consequently, in order to improve the driving stability without disturbing other aspects of the performance of the tire, the angle α at the belt edge point (D) should be maximized when the angle of slope of the lateral stiffness (Sl) is bigger than that of the vertical stiffness of the sidewall(Sv). However, it should be smaller than the angle α' at the point at which the slope of the vertical stiffness of the sidewall is larger than that of the lateral stiffness of the sidewall.

The carcass curve point (the lowest point on the membrane) should be relocated to its optimum location since it is a key factor in determining the stiffness of the sidewall.

Figure 4:
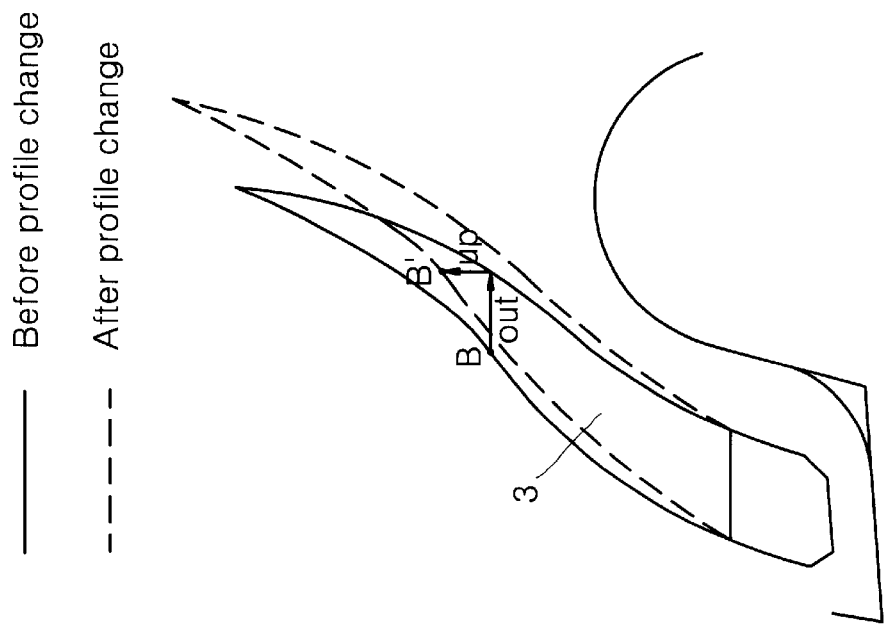
FIG. 4 is a cross-sectional view illustrating the carcass curve point changed by the modified form of the beadfiller of the radial tire according to the present invention.

The tire profile and the beadfiller height (BH) may be appropriately modified in order to raise the ratio of Kl to Kv by modifying the profile of the beadfiller. As illustrated in FIG. 4, the carcass profile may be designed to improve the stiffness of the bead(4) to the sidewall(2) by modifying the position of the bead upper point (B). Thus, the bead upper point (B) may be moved outward by modifying the beadfiller profile to accommodate a wider rim width. Similarly, the bead upper point (B) may be moved upward to allow a smaller membrane.

To optimize the stiffness of the radial tire, the contact area and the profile may be optimized by modifying the carcass profile, the tread radius and the profile. In particular, the lateral stiffness of the tire(Kl) and the torsion stiffness of the tire(Kd) may be improved simultaneously in order to improve the cornering capability. Those parameters are determined by the contact form, contact size and form/degree of hardness of the beadfiller.

In other words, the contact form and the pressure of the radial tire are dependent on the belt tension, the profile, the tread radius and may be optimized (1) by modifying the circumferential deflection stiffness of the belt by changing the profile (2) and by modifying the lateral deflection stiffness of the belt by changing the tread radius.

The profile of the tire according to the present invention is intended to mean the profile of the tire under pressure. Therefore, it is preferable to use a light beadfiller because the mold form should be designed to maintain the said form upon changing the profile of the beadfiller.

Figure 5:
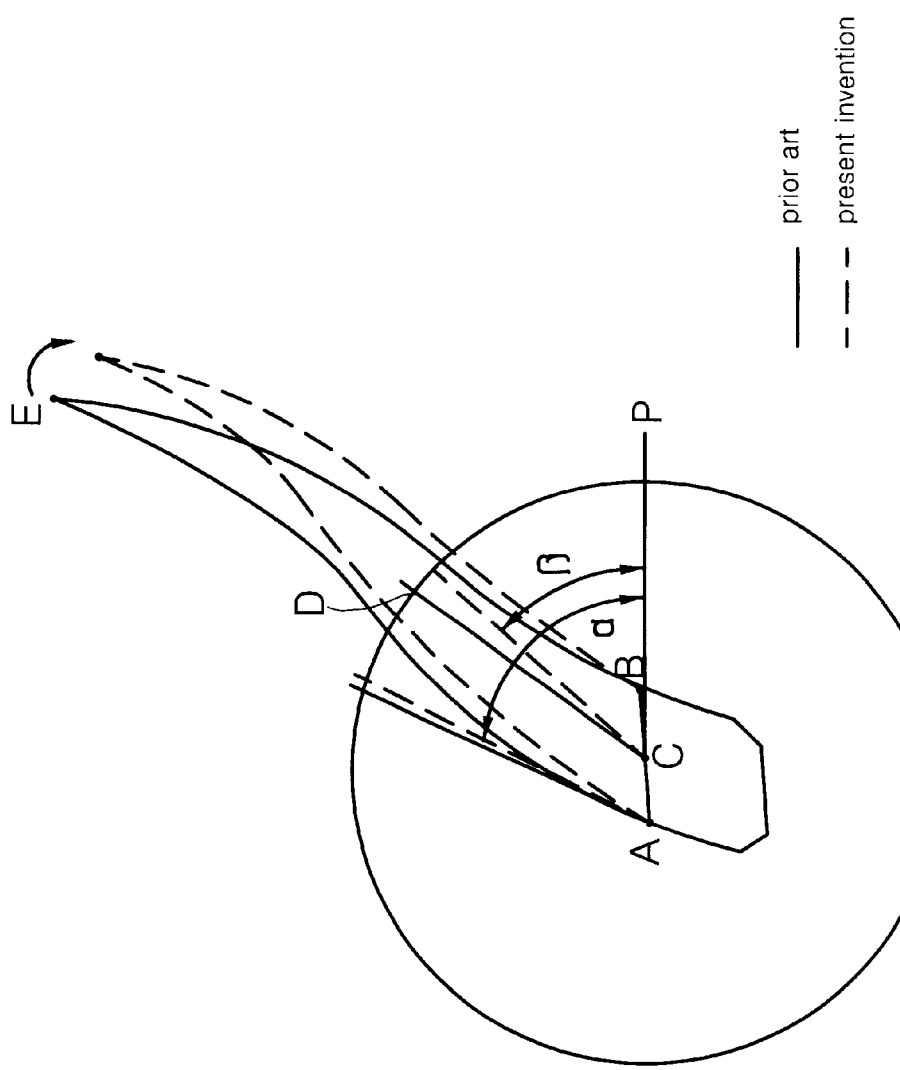
FIG. 5 is a cross-sectional view illustrating the degree of slope of the beadfiller according to the present invention compared to that of a conventional beadfiller.

In FIG. 5, point A is the inner edge of beadfiller standard line(AB) and point C is in the middle of the standard line(AB). Point D is in the middle of the two points on which the beadfiller outer line meets the circle whose center is Point C and whose radius is the beadfiller height (BH)×0.5 and point E is the vertical point in the beadfiller. At that point, α (the angle between the line CP in parallel to the rotation axis of the tire and the tangent to the carcass line at A of the beadfiller inner line(AE), should preferably be less than 72° and β (the angle between the rotation axis of the tire and the line CD) should preferably be less than 56°.

The performance of the radial tire having parameters as hereinbefore defined is significantly improved over the performance of the prior art radial tire. As shown in Table 1, where the beadfiller height is increased from 35 mm to 45 mm both vertical stiffness and lateral stiffness are enhanced. Therefore, it can be seen that as compared to a conventional beadfiller profile, Kl is much greater than Kv.

TABLE 1

| beadfiller | prior art | | | present invention | | |
|---|---|---|---|---|---|---|
| height | 35 | 45 | change | 35 | 45 | change |
| Kv(kgf/mm) | 19.2 | 20.1 | 4.6% | 19.6 | 20.6 | 5.1% |
| Kl(kgl/mm) | 8.0 | 9.1 | 13.75% | 8.3 | 9.7 | 16.9% |

Since the beadfiller profile of the radial tire is changed in order to optimize the stiffness of the tire, the contact length is extended whilst the contact width of the tire is little changed. Consequently, the substantial contact area broadens and the contact pressure become equalized.

Table 2 indicates that the contact length increases whilst the contact area changes little by modifying the profile form in accordance with the invention.

TABLE 2

| load (kgf) | contact area | | contact length | |
|---|---|---|---|---|
| | prior art | present invention | prior art | present invention |
| 160 | 51 | 53 | 89.4 | 94.3 |
| 240 | 78 | 81 | 117.2 | 117.2 |
| 320 | 106 | 111 | 135.3 | 140.2 |
| 400 | 133 | 135 | 153.5 | 157.1 |
| 480 | 155 | 162 | 169.2 | 174.0 |
| 560 | 181 | 182 | 187.3 | 192.1 |
| 640 | 204 | 204 | 203.0 | 205.4 |

As can be seen in Table 3, for the radial the tire according to the present invention the ratio of the change of the contact pressure with regard to the change in the load (the maximum contact pressure on the shoulder under any vertical load/ the maximum contact pressure on the shoulder under 100% load) is decreased over the prior art. This ensures greater safety under changes in pressure and improves cornering characteristics.

TABLE 3

| | ratio of the change of the contact pressure | |
|---|---|---|
| load(%) | prior art | present invention |
| 80 | 0.60 | 0.75 |
| 100 | 1.00 | 1.00 |
| 120 | 1.11 | 1.10 |

In other words, the radial tire according to the present invention achieves ideal contact pressure more quickly and the pressure changed by the load change around the ideal contact pressure is less than in conventional tires. Therefore, the improved lateral stiffness and deflection stiffness of tire help to improve the dynamic characteristics of the tire as seen in Table 2.

Figure 6:
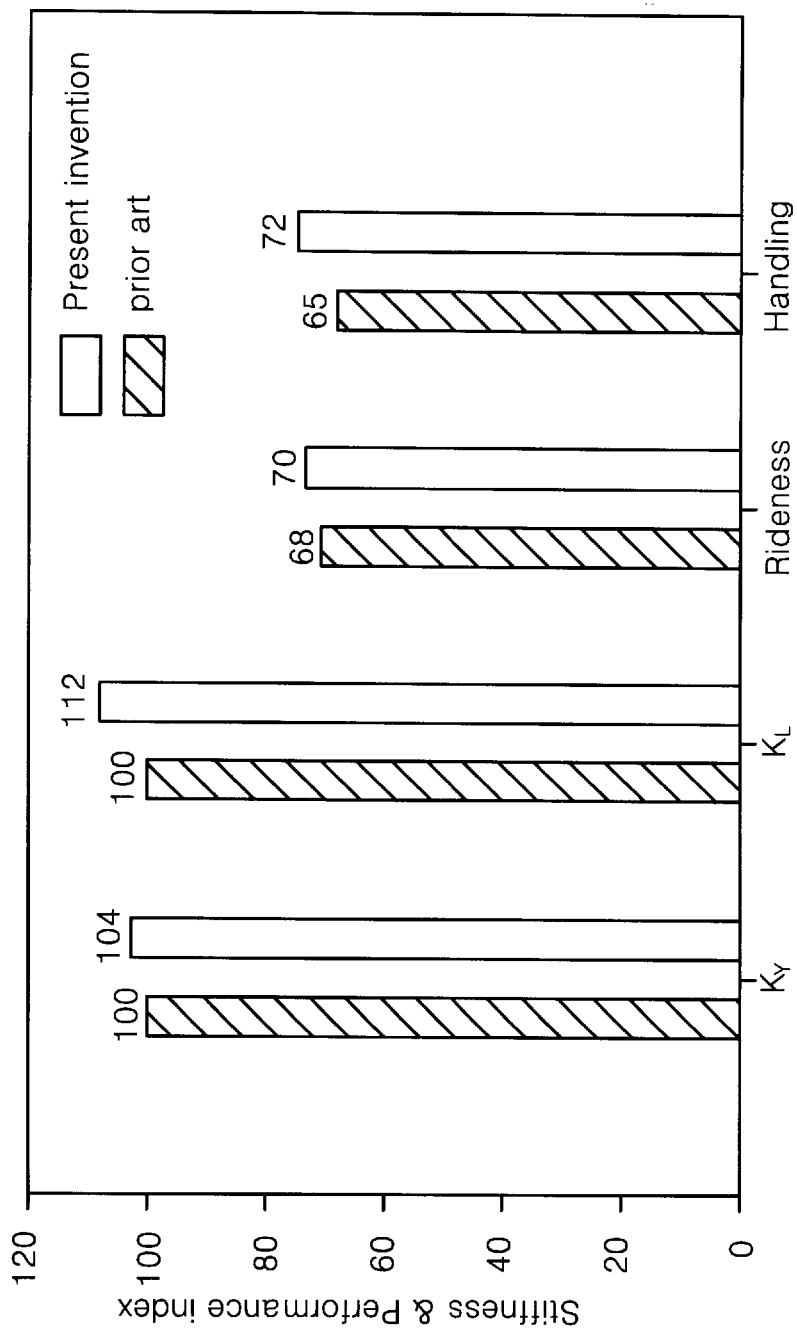
FIG. 6 is a diagram illustrating the stiffness and other characteristics of the radial tire according to the present invention compared to that of a conventional radial tire.
Figure 7:
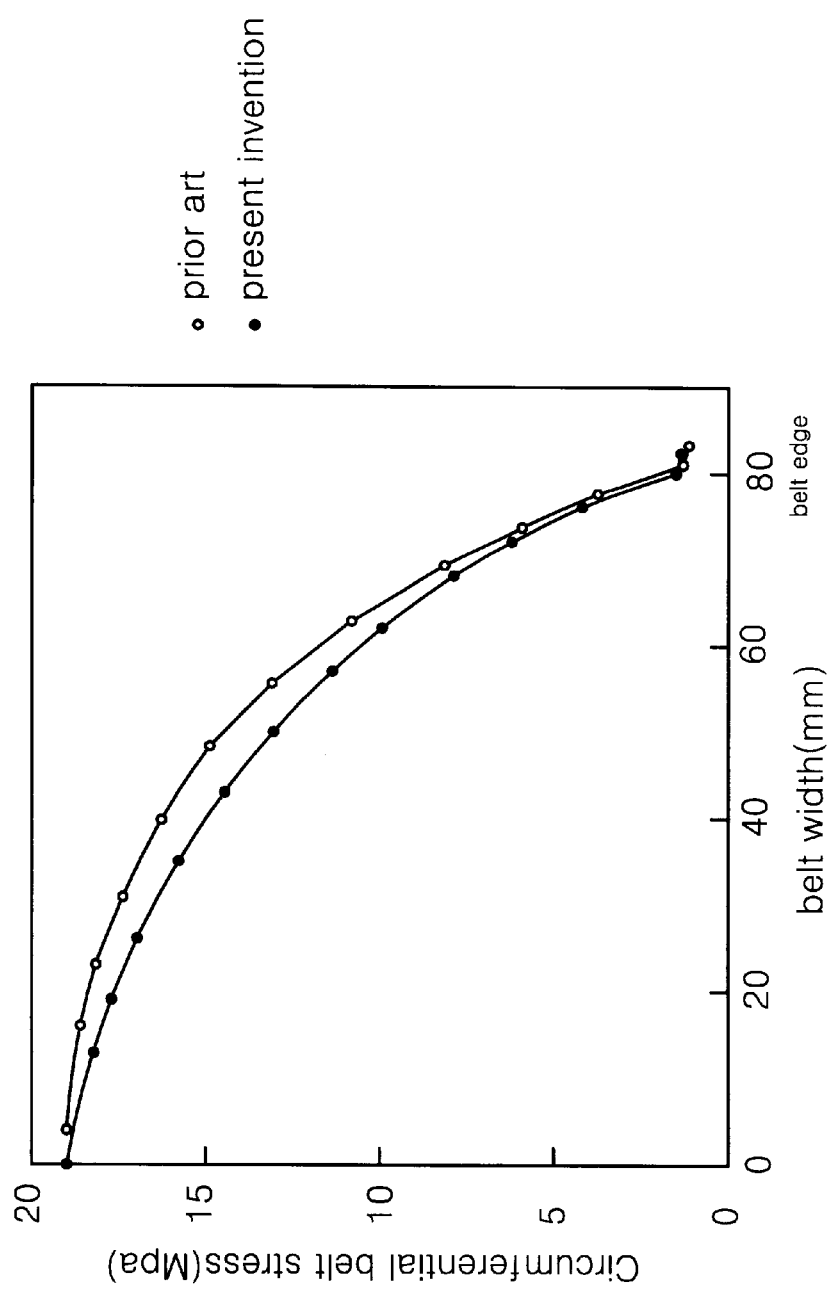
FIG. 7 is a diagram illustrating the belt tension of the radial tire according to the present invention compared to that of a conventional radial tire.

As shown in FIG. 6 (the shaded areas indicate the conventional art, whereas the unshaded areas indicate the present invention) the vertical stiffness of the tire and the lateral stiffness of the tire according to the present invention are increased over the prior art. As a result, the driving stability and the riding comfort are increased. According to the present invention, whilst the stiffness is increased by modifying the profile, the cross-sectional width is increased in such a way that riding comfort is not adversely affected due to the high vertical stiffness. The tire belt tension is large enough to enhance the enveloping feature that wraps projections on the roads by lowering the belt tension. FIG. 7 (dark circles indicate the present invention and hollow circles indicate the prior art) shows a comparison made between the belt tension of the present invention and of the prior art. As seen in FIG. 7, the ratio of the vertical stiffness of the tire to the lateral stiffness of the tire according to the present invention is greater than that of the prior art and the stiffness of the tire is on the whole optimized.

Table 4 shows the results when the mold profile and the beadfiller slope are modified.

TABLE 4

| | | prior art | present invention | change(%) |
|---|---|---|---|---|
| stiffness of sidewall | Sv | 70.8 | 72.1 | 1.80 ↑ |
| | Sl | 25.4 | 28.5 | 12.20 ↑ |
| | Sr | 71.6 | 77.8 | 8.70 ↑ |
| stiffness of tire | Kv | 19.2 | 18.9 | 1.56 ↓ |
| | Kl | 8.5 | 8.9 | 4.70 ↑ |
| | Kd | 572.0 | 563.7 | 1.45 ↓ |

As can be seen in Table 4, when the degree of the slope of the beadfiller is lowered in accordance with the invention over the prior art, both the lateral stiffness of the tire and the torsion stiffness of the tire is enhanced with relatively constant vertical stiffness. Furthermore, the increasing ratio of the vertical stiffness to the lateral stiffness of the sidewall is higher than that of the prior art i.e. the ratio of the vertical stiffness (Sv) to the lateral stiffness (Sl) and the ratio of the vertical stiffness to the rotational stiffness (Sr), is greatly increased.

Figure 8:
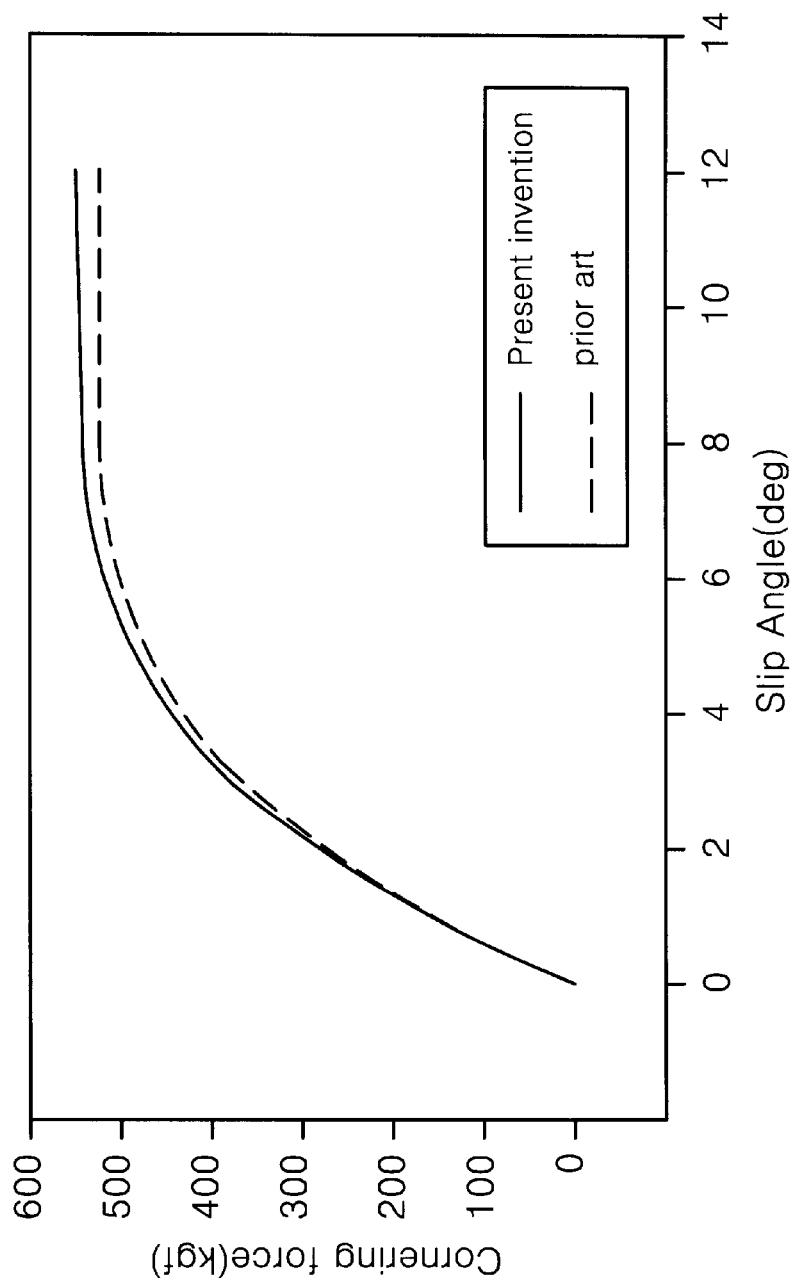
FIG. 8 is a diagram illustrating the cornering force according to the present invention compared to that of a conventional radial tire, dependent on the slip angle changed by vertical load.

The cornering force is dependent on the change of slip angle under 100% vertical load and has been measured in order to compare performance of the prior art with the invention. This reveals that the cornering force of the radial tire according to the present invention is stronger than that of the conventional art (see FIG. 8).

What is claimed is:

1. A radial tire capable of being mounted on a rim and filled to normal internal pressure such that the ratio of upper cross-sectional height USH to cross-sectional height SH is between 0.50 to 0.59; the ratio of lower cross-sectional height LSH to cross-sectional height SH is between 0.40 and 0.50; the rim width is more than 1.40×measuring rim width and less than 1.45×measuring rim width; the aspect ratio is less than 0.65; the beadfiller height is greater than 0.224× SH; the angle between the tangent to the carcass line at a bead upper point (B) and the line extending in parallel with the rotation axis of the tire is less than 45°.

2. A radial tire according to claim 1, wherein the Shore A hardness of the said beadfiller is greater than 85.

3. A radial tire according to claim 1, wherein xb, the x-axis component of the bead upper point B, is greater than the measuring rim width×0.5.

4. A radial tire as claimed in claim 3, wherein xb is within the range measuring rim width+5–10 mm.

5. A radial tire as claimed in any preceding claim formed so that $\alpha$the angle between line CP in parallel with the rotation axis of the tire and a tangent to the carcass line at a point A on the beadfiller inner line AE, is less than 72° and $\beta$, the angle between line CP in parallel with the rotation axis of the tire and line CD, is less than 56°.

* * * * *